United States Patent
Bharti et al.

(10) Patent No.: US 10,789,536 B2
(45) Date of Patent: Sep. 29, 2020

(54) USING TRIE STRUCTURES TO EFFICIENTLY IDENTIFY SIMILARITIES AMONG TOPICAL SUBJECTS

(71) Applicant: International Business Machines Corporation, Armonk, NY (US)

(72) Inventors: Harish Bharti, Pune (IN); Rajesh K. Saxena, Pun (IN); Sandeep Sukhija, Noida (IN)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 15/671,588

(22) Filed: Aug. 8, 2017

(65) Prior Publication Data

US 2019/0050744 A1 Feb. 14, 2019

(51) Int. Cl.
*G06N 5/04* (2006.01)
*G06N 7/00* (2006.01)
*G06N 5/00* (2006.01)
*G06F 16/35* (2019.01)
*G06F 16/335* (2019.01)

(52) U.S. Cl.
CPC ........... *G06N 5/045* (2013.01); *G06F 16/335* (2019.01); *G06F 16/35* (2019.01); *G06N 5/003* (2013.01); *G06N 7/005* (2013.01)

(58) Field of Classification Search
CPC ................................ G06N 5/04; G06N 5/046
USPC .................................................. 706/15, 45
See application file for complete search history.

(56) References Cited

U.S. PATENT DOCUMENTS

| 7,822,631 | B1 | 10/2010 | Vander Mey et al. |
| 9,159,031 | B2 | 10/2015 | Diaz |
| 2004/0015344 | A1 | 1/2004 | Shimomura et al. |

(Continued)

OTHER PUBLICATIONS

Augello et al., Humorist Bot: Bringing Computational Humor in a Chat-Bot System, Source: Complex, Intelligent and Software Intensive Systems, 2008. CISIS 2008, International Conference held on Mar. 4-7, 2008, Publisher: IEEE Retrieved from Interenet: URL: http://ieeexplore.ieee.org/document/4606756/, pp. 703-708.

(Continued)

*Primary Examiner* — David R Vincent
(74) *Attorney, Agent, or Firm* — Schemeiser, Olsen & Watts; Mark c. Vallone

(57) ABSTRACT

A method and associated systems for identifying inputs to be used by a decision-support application. The decision-support application requests from the input-selection system a set of topics of interest that have experienced similar trends in public interest over a specified period of time, subject to certain constraints and confidence factors. In response, the system uses content retrieved from online news and social-media sources to identify common topics and past trends of public interest in each of those topics. The system then retrieves, from a more robust set of sources that include online references and encyclopedias, content related to the most popular topics and their related qualities. The system builds a Trie data structure for each topic and its related qualities and uses properties of Trie structures to efficiently identify the most similar Tries. The system then returns to the decision-support application the topics that correspond to the most similar Tries.

20 Claims, 4 Drawing Sheets

(56) References Cited

U.S. PATENT DOCUMENTS

| | | | |
|---|---|---|---|
| 2011/0167061 A1* | 7/2011 | Li | G06F 16/50 |
| | | | 707/728 |
| 2012/0303661 A1* | 11/2012 | Blohm | G06F 40/295 |
| | | | 707/776 |
| 2015/0371627 A1 | 12/2015 | Lee et al. | |
| 2016/0191639 A1* | 6/2016 | Dai | G06Q 30/0267 |
| | | | 709/204 |
| 2016/0253710 A1 | 9/2016 | Publicover et al. | |
| 2017/0109426 A1* | 4/2017 | Arora | G06F 16/2246 |

OTHER PUBLICATIONS

Sjobergh et al., What Does 3.3 Mean? Using Informal Evaluation Methods to Relate Formal Evaluation Results and Real World Performance, Source: International Journal of Computational Linguistics Research, 2010, Publisher: ResearchGate, Retrieved from Interenet: URL: https://www.researchgate.net/publication/236134496, 8 pages.

U.S. Appl. No. 15/671,382, filed Aug. 8, 2017.

* cited by examiner

USING TRIE STRUCTURES TO EFFICIENTLY IDENTIFY SIMILARITIES AMONG TOPICAL SUBJECTS

BACKGROUND

The present invention relates generally to characterizing trends in popular interest and relates in particular to using Trie structures to efficiently identify topics that are associated with similar time-varying patterns of popular interest.

It can be useful to identify subtle similarities among two or more topics of interest or among two or more types of subject matter. For example, it may be possible to compare or analogize two subjects in a non-obvious way if those two subjects tend to elicit similar patterns of public interest, but are dissimilar enough to make such comparisons and analogies surprising. The ability to identify such similarities between seemingly unrelated subjects can thus facilitate the creation of a comparison or an insightful analogy.

SUMMARY

An embodiment of the present invention provides an input-selection system of a decision-support application comprising a processor, a memory coupled to the processor, and a computer-readable hardware storage device coupled to the processor, the storage device containing program code configured to be run by the processor via the memory to implement a method for using Trie structures to identify similarities among topical subjects, the method comprising:

receiving, from a decision-support application, a set of contextual constraints, a set of confidence factors, and a request for an identification of two subjects of interest that satisfy the set of contextual constraints and that meet a similarity criterion, where a first subject of the two subjects is associated with a first subset of a set of time-varying qualities, where a second subject of the two subjects is associated with a second subset of the set of time-varying qualities, where the similarity criterion deems the two subjects to be similar if, during a period of time specified by the similarity criterion, a first pattern of variations of the first subset is similar to a second pattern of variations of the second subset, and where the similarity criterion comprises a similarity threshold capable of allowing the input-selection system to determine whether two patterns of variations are similar;

extracting from a first set of online sources a set of objects that each satisfy at least one constraint of the set of contextual constraints, where a first object of the set of objects is associated with a corresponding subject and with a first quality of public interest in the corresponding subject;

selecting a core set of subjects and a core set of qualities;

where the core set of subjects comprises subjects that are each associated with a number of objects of the set of objects that exceeds a core-subject threshold value, and where the core set of qualities comprises qualities that are each associated with a number of objects of the set of objects that exceeds a core-quality threshold value;

retrieving from a second set of online sources a quantity of objects that each satisfy at least one constraint of the set of contextual constraints and that are each associated with a subject of the core set of subjects or with a quality of the core set of qualities;

representing the quantity of objects as a set of Trie data structures, where each Trie of the set of Trie data structures represents objects associated with one core subject of the core set of subjects and further represents a pattern of variations over time in one or more qualities of the core set of qualities, and where each of the one or more qualities is a quality of public interest in the one core subject;

determining, as a function of the similarity criterion, a pair of similar Tries of the set of Trie data structures;

identifying the two subjects as being a pair of core subjects that are respectively represented by the pair of similar Tries; and returning to the decision-support application the two identified subjects.

Another embodiment of the present invention provides a method for using Trie structures to identify similarities among topical subjects, the method comprising:

an input selection system of a decision-support application receiving, from a decision-support application, a set of contextual constraints, a set of confidence factors, and a request for an identification of two subjects of interest that satisfy the set of contextual constraints and that meet a similarity criterion, where a first subject of the two subjects is associated with a first subset of a set of time-varying qualities, where a second subject of the two subjects is associated with a second subset of the set of time-varying qualities, where the similarity criterion deems the two subjects to be similar if, during a period of time specified by the similarity criterion, a first pattern of variations of the first subset is similar to a second pattern of variations of the second subset, and where the similarity criterion comprises a similarity threshold capable of allowing the input-selection system to determine whether two patterns of variations are similar;

extracting from a first set of online sources a set of objects that each satisfy at least one constraint of the set of contextual constraints, where a first object of the set of objects is associated with a corresponding subject and with a first quality of public interest in the corresponding subject;

selecting a core set of subjects and a core set of qualities, where the core set of subjects comprises subjects that are each associated with a number of objects of the set of objects that exceeds a core-subject threshold value, and where the core set of qualities comprises qualities that are each associated with a number of objects of the set of objects that exceeds a core-quality threshold value;

retrieving from a second set of online sources a quantity of objects that each satisfy at least one constraint of the set of contextual constraints and that are each associated with a subject of the core set of subjects or with a quality of the core set of qualities;

representing the quantity of objects as a set of Trie data structures, where each Trie of the set of Trie data structures represents objects associated with one core subject of the core set of subjects and further represents a pattern of variations over time in one or more qualities of the core set of qualities, and where each of the one or more qualities is a quality of public interest in the one core subject;

determining, as a function of the similarity criterion, a pair of similar Tries of the set of Trie data structures;

identifying the two subjects as being a pair of core subjects that are respectively represented by the pair of similar Tries; and returning to the decision-support application the two identified subjects.

Yet another embodiment of the present invention provides a computer program product, comprising a computer-readable hardware storage device having a computer-readable program code stored therein, the program code configured to be executed by an input-selection system comprising a processor, a memory coupled to the processor, and a computer-readable hardware storage device coupled to the processor, the storage device containing program code configured to be run by the processor via the memory to implement a method for using Trie structures to identify similarities among topical subjects, the method comprising:

an input selection system of a decision-support application receiving, from a decision-support application, a set of contextual constraints, a set of confidence factors, and a request for an identification of two subjects of interest that satisfy the set of contextual constraints and that meet a similarity criterion, where a first subject of the two subjects is associated with a first subset of a set of time-varying qualities, where a second subject of the two subjects is associated with a second subset of the set of time-varying qualities, where the similarity criterion deems the two subjects to be similar if, during a period of time specified by the similarity criterion, a first pattern of variations of the first subset is similar to a second pattern of variations of the second subset, and where the similarity criterion comprises a similarity threshold capable of allowing the input-selection system to determine whether two patterns of variations are similar;

extracting from a first set of online sources a set of objects that each satisfy at least one constraint of the set of contextual constraints, where a first object of the set of objects is associated with a corresponding subject and with a first quality of public interest in the corresponding subject;

selecting a core set of subjects and a core set of qualities, where the core set of subjects comprises subjects that are each associated with a number of objects of the set of objects that exceeds a core-subject threshold value, and where the core set of qualities comprises qualities that are each associated with a number of objects of the set of objects that exceeds a core-quality threshold value;

retrieving from a second set of online sources a quantity of objects that each satisfy at least one constraint of the set of contextual constraints and that are each associated with a subject of the core set of subjects or with a quality of the core set of qualities;

representing the quantity of objects as a set of Trie data structures, where each Trie of the set of Trie data structures represents objects associated with one core subject of the core set of subjects and further represents a pattern of variations over time in one or more qualities of the core set of qualities, and where each of the one or more qualities is a quality of public interest in the one core subject;

determining, as a function of the similarity criterion, a pair of similar Tries of the set of Trie data structures;

identifying the two subjects as being a pair of core subjects that are respectively represented by the pair of similar Tries; and returning to the decision-support application the two identified subjects.

DETAILED DESCRIPTION

Figure 1:
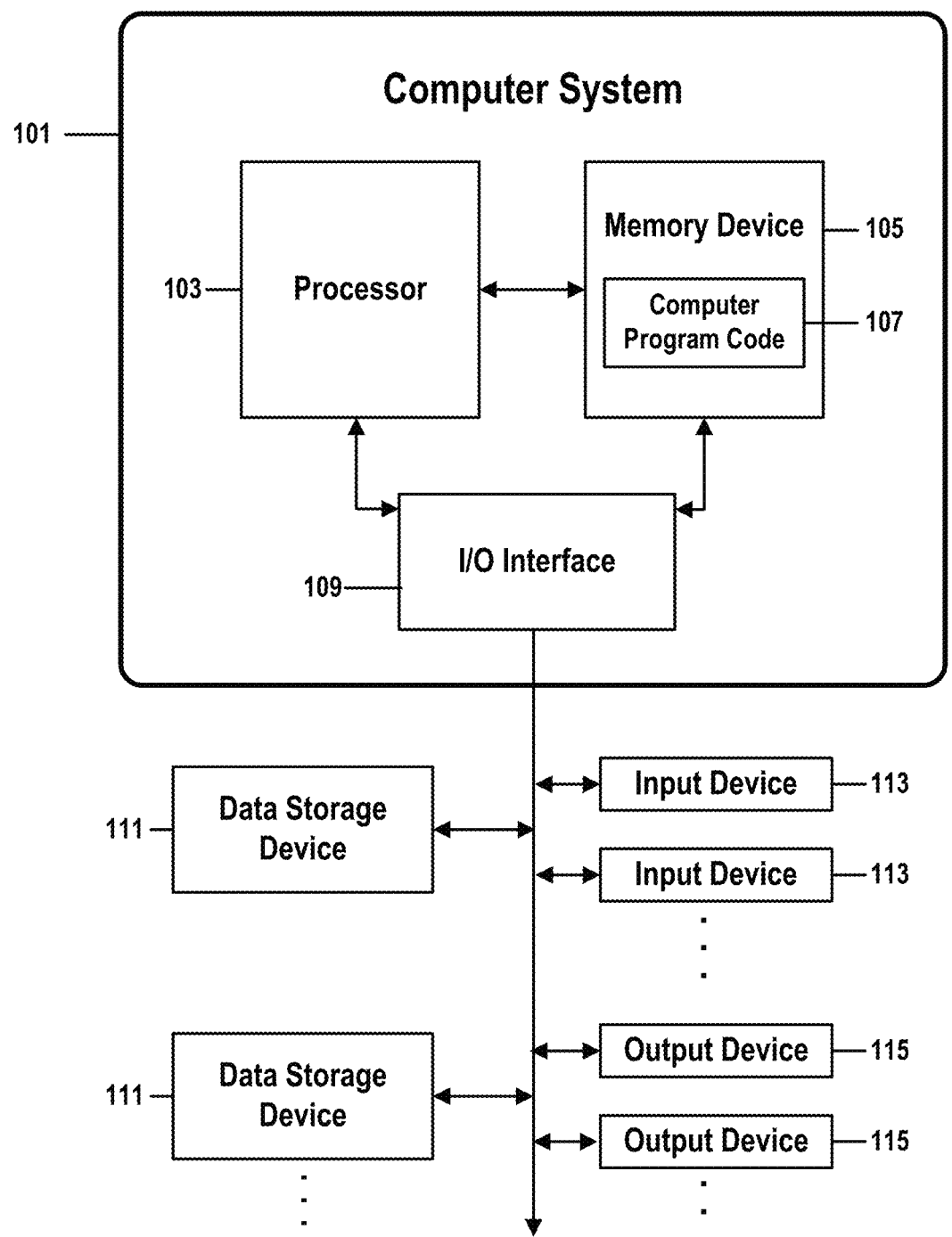
FIG. 1 shows the structure of a computer system and computer program code that may be used to implement a method for using Trie structures to efficiently identify similarities among topical subjects in accordance with embodiments of the present invention.

Artificial-intelligence, modeling, machine-learning, and other types of decision-support or quasi-intelligent software systems can be used in fields like marketing, finance, advertising, e-commerce, psychology, economics, or public-opinion polling to identify, predict, or otherwise characterize time-varying trends of public interest in news items, current events, or other popular subjects of interest.

Such systems are, however, prone to error because they are generally unable to detect relationships among seemingly unrelated subjects that elicit similar types of reactions from certain segments of the public. The ability to identify and quantize such similarities would also be useful in other fields, such as in songwriting, journalism, or entertainment, where irony, insightful observations, or anecdotes often comprise a comparison between two subjects that appear unrelated but have surprising commonalities.

There is thus a need to solve this technical problem, which is rooted in computerized systems' inability to reliably identify time-varying patterns in public interest n seemingly disparate subjects.

Embodiments of the present invention address such technical problems by identifying time-varying patterns that may characterize variations in public opinion, sentiment, or levels of public interest in particular topics of interest or in particular types of subject matter. Such embodiments may, in response to receiving a request for identification of such similarities from a decision-support, online analytics, artificial intelligence, machine-learning, or other type of application, by identifying topics or types of subject matter that are associated with similar time-varying patterns of public opinion, sentiment, or interest, and then provide these identified topics or subject matter to the requesting application. In this way, the embodiment allows the requesting application to identify nuanced similarities or dissimilarities that would otherwise be difficult for the requesting application to identify.

Furthermore, embodiments of the present invention perform this task with great efficiency through a novel use of Trie data structures to represent degrees of similarity between pairs of subjects. This novel use allows complex, time-varying characteristics of various qualities of each subject to be represented as simple character strings, allowing embodiments to use simple text-matching operations to identify, quantize, and compare subtle similarities between the ways that each subject's characteristics vary over time.

Such an extrinsic similarity between two topics might, for example, comprise similarly increasing or decreasing levels of public interest in the two topics or similar variations in public sentiment about the two topics. An embodiment might, for instance, determine that an award ceremony and a national election are similar to each other if social-media activity about these two subjects among 18-to-35 year-old Arizona residents had peaked at similar times during the preceding week or if public opinion about the two subjects had transitioned between positive and negative at similar times during the preceding month.

Such similarities may be difficult to identify or may even seem counterintuitive, and this is especially true when topics or types of subject matter appear to be unrelated. Embodiments of the present invention identify extrinsic similarities by encoding variations in a subject's "qualities" (such as time-varying trends in a level of public interest) as a branch of a Trie data structure. Unlike other methods of representing such information, similarities between data sets represented as Trie branches may be determined with great efficiency.

The standard Trie known in the art is a type of tree data structure that stores only key values at each node, allowing an entire root-to-leaf branch to be represented as a concatenation of key values of that branch's nodes. Embodiments of the present invention represent each subject of interest as a distinct Trie, and each branch of a particular Trie represents time-varying behavior of a quality of that Trie's subject. Similarities between qualities of two subjects may thus be determined by simply comparing a pair of character strings generated by traversing a pair of corresponding branches of two Tries.

As will be described below, embodiments of the present invention: identify subjects most likely to be relevant; construct a Trie for each identified subject; represent time variations in each quality of an identified subject as a root-to-leaf branch of that subject's Trie; and then identify similarities between subjects by comparing character strings generated by traversing corresponding branches of each subject's Trie.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet n Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for using Trie structures to identify similarities among topical subjects in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for using Trie structures to identify similarities among topical subjects in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for using Trie structures to identify similarities among topical subjects.

Any of the components of the present invention could be created, integrated, hosted, maintained, deployed, managed, serviced, supported, etc. by a service provider who offers to facilitate a method for using Trie structures to identify similarities among topical subjects. Thus the present invention discloses a process for deploying or integrating computing infrastructure, comprising integrating computer-readable code into the computer system 101, wherein the code in combination with the computer system 101 is capable of performing a method for using Trie structures to identify similarities among topical subjects.

One or more data storage units 111 (or one or more additional memory devices not shown in FIG. 1) may be used as a computer-readable hardware storage device having a computer-readable program embodied therein and/or having other data stored therein, herein the computer-readable program comprises stored computer program code 107. Generally, a computer program product (or, alternatively, an article of manufacture) of computer system 101 may comprise the computer-readable hardware storage device.

While it is understood that program code 107 for a method for using Trie structures to identify similarities among topical subjects may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for using Trie structures to identify similarities among topical subjects is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown) where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
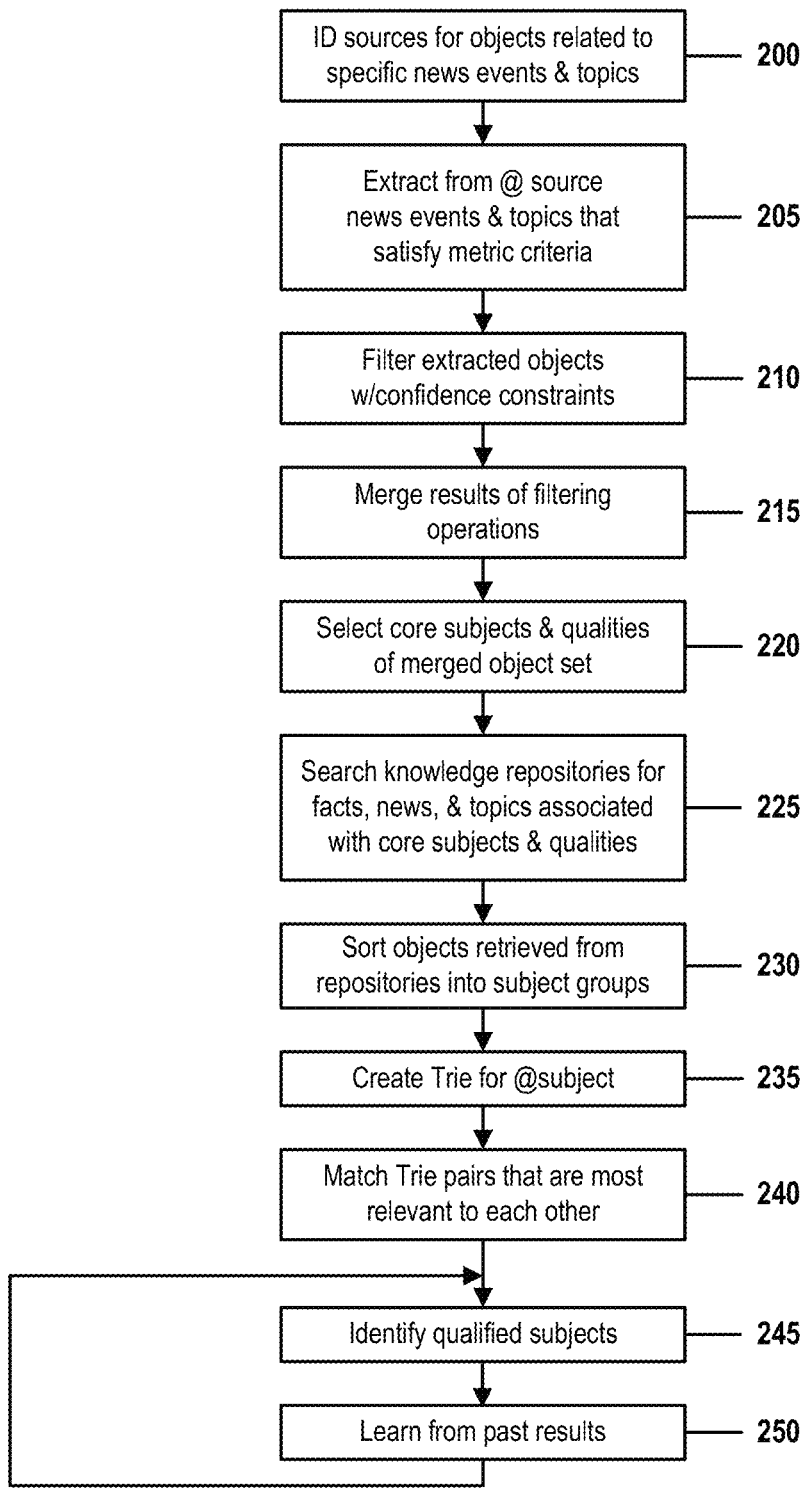
FIG. 2 is a flow chart that illustrates the steps of a method for using Trie structures to identify similarities among topical subjects in accordance with embodiments of the present invention.

FIG. 2 is a flow chart that illustrates the steps of a method for using Trie structures to identify similarities among topical subjects in accordance with embodiments of the present invention. FIG. 2 shows steps 200-250.

In step 200, a processor of a computer system receives or identifies a list of online or electronic sources. These sources may comprise a list of news sources for content associated with news items, such as Internet news Web sites or online news aggregators, and may further comprise a list of subject sources for content organized by subject matter or discussion topic, such as social-media services that organize user postings into topics.

In step 205, the system extracts objects from the news sources and subject sources identified in step 200. This may comprise retrieving from the news sites objects that are each associated with specific news events or issues and may further comprise retrieving from the subject sources objects that are each associated with a particular topic of interest.

In some embodiments, extracted objects are selected or later filtered or grouped such that the extracted objects are organized into two or more sets. This selection or filtering may be performed by means of metrics that limit the extraction procedure to a specific context.

Table 1 illustrates one possible set of contextual metrics that may be used to constrain or organize the extracted objects. In this example, Table 1 identifies values of three metrics (Location, Duration, and Age Group), where those values establish contextual criteria that must be met by extracted objects. Many other types of metrics may be defined that identify other criteria, such as a specified period of time, a physical or logical location, a geographical region, or a user demographic.

In this example, the system would in step 205 either extract only objects that satisfy one of these metrics, or would extract all available objects and apply the contextual criteria to the extracted objects after extraction. Either alternative will work and, although the first method is more efficient, the second method may be desirable when interface constraints of one or more sources do not readily support using desired contextual criteria to select content.

That is, the system would extract one set of objects from the news sources and subject sources that comprises objects associated with or that originate from Arizona. The system would extract a second set of objects from the news sources and subject sources that are associated with news items or topics that have been characterized by a source as having "trended" (or having undergone a rapid increase in public interest) for a period of time greater than the last five days. Similarly, the system would extract a third set of objects from the news sources and subject sources that are associated with news items or topics posted by users within the 18-35 age group.

TABLE 1

| Metric | Criteria |
|---|---|
| Location | Arizona, USA |
| Duration | Trending > 5 days |
| Age Group | 18-35 yrs |

At the conclusion of step 205, the system will have extracted sets of objects from the sources identified in step 200. These objects may comprise any sort of content associated with particular news items or topics of interest, and each set will comprise extracted objects that satisfy a criterion identified by a metric similar to those shown in Table 1. If an object satisfies more than one such metric, that object could be comprised by more than one corresponding group.

In step 210, each set of objects may be further filtered by a set of quantitative confidence criteria that may be set in order to manage the size of the retrieved data sets or to manage the precision with which contextual criteria are applied. In some embodiments, this step may be performed as a means of applying weightings to the contextual metrics shown in Table 1. Other embodiments, however, may omit filtering of extracted objects by confidence criteria like those listed in the column headings of Table 2.

TABLE 2

| Metric | Time Series Data | Propagation Benchmark | Tolerance |
|---|---|---|---|
| Location | 90% | 80% | 2% |
| Duration | 90% | 85% | 20% |
| Age Group | 95% | 80% | 2% |

In the example of Table 2, three confidence criteria are defined: Time Series Data, Propagation Benchmarks, and Tolerance (or "Control Range"). In other embodiments, Table 2 may comprise other types of confidence criteria, including those known in the art of statistical analysis, such as variance or standard deviation.

Each Time Series Data value identifies a minimum % of time during which extracted objects must satisfy one of the Table 1 context criteria. For example, if the system in step 205 had extracted objects posted over the previous 24 hours, then a Time Series Data value of 95% for the Table 1 "Age Group" contextual parameter means that objects extracted from a particular source, and related to a particular news item, must have been posted by users within the 18-35 age bracket at least 95% of the time during past 24 hours. If that is not true, then the system may discard all objects extracted from that particular source that are related to that particular news item.

In another example, assume that the system in step 205 extracted all Twitter tweets posted with a hashtag of # inflation (a type of Twitter subject identifier) during the preceding week. The 90% figure in the "Location" row of Table 2 would thus indicate that # inflation tweets selected in step 205 should be retained only if those tweets satisfy Table 1's "Location" criteria at least 90% of the time during the previous week.

That is, if the system had in step 205 selected tweets created during the preceding week because those objects satisfied at least one of the Table 1 context criteria, the system in step 210 would then determine whether those selected tweets had been posted from locations in Arizona during at least 90% of the preceding week. If so, the system would not discard the extracted tweets as a function of the Time Series Data/Location constraint.

Conversely, if the extracted tweets had been posted on Twitter from Arizona during only 20% of the preceding week, then the system would discard all selected Twitter tweets with # inflation hashtags, regardless of whether any individual # inflation tweet had been posted from Arizona.

Embodiments of the present invention may accommodate any means known in the art or desired by an implementer to determine what constitutes a "percent" of a period of time. For example, an embodiment may determine that a set of postings satisfy a particular criterion during 20% of a specified period of time if those postings span a contiguous duration of time that comprises 20% of the total period of time.

But another embodiment may perform this task by dividing the specified period of time into blocks of one hour, one minute, or another duration, and by then determining that the postings satisfy the 20% criterion only if the postings occur during at least 20% of the blocks, regardless of whether those blocks are contiguous.

Similarly, each Propagation Benchmark value identifies how quickly a Table 1 metric is propagating throughout a source. For example, the 85% Propagation Benchmark/ Location value of Table 2 tests whether postings on a particular source related to a particular subject or news item are propagating at a rate of 85% within constraints of the Location metric that is, whether at least 85% of those postings have been reposted, replied to, or have otherwise spawned new postings from users in Arizona. Here, if fewer than 85% of those postings have spawned new objects related to the same topic at the same source during the period of time during which objects were extracted in step 205, then the system will discard all postings extracted from that source and related to the same topic.

Each Tolerance (or "Control Range") value identifies a tolerance range within which one of the contextual metrics of Table 1 may be evaluated. For example, the system in step 210 might use the Duration/Criteria value "Trending >5 days" of Table 1 to test whether a previously extracted social-media posting was part of a topic that had been "trending" (popular and increasing in popularity) during the previous five days. Here, the Time Series Data/Duration value "20%" would identify a tolerance of one day (20% of five days) when testing the extracted posting—thus allowing the posting to satisfy the test even if the posting had been trending for only four days.

In some cases, a Tolerance value may not be identified for a particular metric. This may occur, for example, when a metric does not measure a quantitative or numeric entity, such as a location. In other embodiments, though, a Tolerance value may more readily interpreted as a confidence range of a probability value. Consider, for example, the 90% Location/Time Series Data value of Table 2. Here, determining whether a set of objects satisfies the Location/Time Series constraint comprises determining whether each object of the set of objects originated with a user in the state of Arizona. As described above, the corresponding 2% Location/Tolerance value might be interpreted as extending the Location/Time Series Data value to comprise a range of 88%-92%. But in other embodiments, the % Location/ Tolerance value might be interpreted as a margin of error in the determinations of whether an object originated in Arizona. This margin of error may be especially significant in cases where a determination that an object originated in Arizona is not certain, but is instead inferred from metadata, context, or other indirect means.

The procedure of step 210 is applied in this manner to each set of data objects retrieved in step 200. This will result in a group of filtered subsets of each original set of data objects, where each subset consists of objects that have satisfied the filtering operations that correspond to parameters listed here in Table 1 and Table 2.

In step 215, the system merges the filtered subsets created in step 210. The embodiment of FIG. 2 performs this merging operation after completing the contextual filtering operations of steps 205 and 210, such that each set is first independently filtered, after which the resulting subsets are merged into a single filtered set of objects. In other embodiments, however, the merging of step 215 may be performed prior to the contextual filtering operations of step 210, such that the extracted sets are first merged into a single set that is then contextually filtered by a single application of the constraints of Table 2. The present invention is flexible enough to accommodate either approach, allowing implementers to fine-tune an embodiment to more efficiently process extracted data as a function of each data set's size, complexity, or other characteristics.

Regardless of the order of these steps, at the conclusion of steps 210 and 215, the system will have produced a single set of extracted objects that has been subject to two levels of filtering, where those two levels correspond respectively to constraints similar to those identified here in Table 1 and Table 2.

In step 220, the system identifies and associates a "core" set of subjects and qualities of the filtered, merged set of objects generated in steps 210 and 215. This core set consists of subjects and qualities associated with the greatest number of objects of the merged set or that are deemed to be most significant. For example, if an embodiment is designed to identify subject matter that is related to an upcoming national election, the embodiment may incorporate a weighting system that assigns greater significance to subjects that comprise the names of politicians and political candidates.

As described above, a subject associated with an extracted object may identify a type of subject matter, topic, or other type of content comprised by an object. In some embodiments, each object may be associated with only one subject, but other embodiments may allow an object to be associated with multiple subjects.

In one example, a news item that discusses relative chances of five popular movies to win a Best Picture award at an upcoming Academy Awards ceremony might be associated with the subject "Academy Awards." In embodiments that allow an item to be associated with multiple subjects, that news item might also be associated with five other subjects that respectively refer to each of the five movies. If one of those five movies was about the U.S. Civil War, the news item might further be associated with that war or with a subject of "American History."

Similarly, a social-media review of a book may be associated with one or more subjects related to the subject matter of the book, such as "Architecture" or "Railroads." A posting to an online discussion group with a subject line of "Alternatives to the Big Bang Theory" may be associated with subjects ranging from "Astrophysics" and "Cosmology" to "Television" (since "Big Bang Theory" is the name of a popular television series).

An embodiment may associate an extracted object with a subject by any means known in the art. These means may simply look for keywords in a subject line, spoken or written content, or metadata, or may comprise more sophisticated means, such as methods of artificial intelligence or online analytics. Such means may thus comprise a combination of methods like keyword matching, string pattern matching, semantic analytics, or text analytics.

A quality of an extracted object characterizes a manner in which the subject of the extracted object appears online or in which objects similar to the extracted object appear. Here, "similar" objects are generally those that share at least one common subject or that share subjects that an implementer deems to be related.

Consider, for example, a case where an embodiment has over the past three days captured several hundred news items and social-media postings that each concern an ongoing wildfire in Southern California. By analyzing the date and time of each extracted object, the embodiment may describe a quality of this posting activity at intervals throughout the past three days.

For example, the embodiment may identify that, at the outset of the three-day period, there had been too few postings on this topic to be statistically meaningful, at a time 12 hours later than the outset, postings about or related to the wildfire were increasing, at a time that was 24 hours after the outset, postings were rapidly increasing, during the following 24 hours, the frequency of postings was stable, and during the final 24 hours, the frequency of postings declined.

In this example, each of these changes in the frequency of postings related to the wildfire would be considered a "quality" and the chronological sequence of qualities for this subject would be considered to be a pattern.

The examples and embodiments described here should not be construed to limit embodiments of the present invention to only those qualities mentioned in this document. The present invention is flexible enough to accommodate any sort of quality of interest to an implementer. For example, a quality might identify changes in a level of a sentiment expressed in a social-media posting, or might characterize quantity or frequency of postings about a particular subject as a function of whether those postings meet a threshold value for overall frequency or frequency at a particular source.

Although implementers are free to select any known method of performing step 220, including methods that comprise weighting of certain subjects or qualities or that use statistical methods, a simple and effective way method is to simply count the number of subjects and the number of qualities associated with the merged set and to select those subjects and qualities that are the most common or that occur in a number that exceeds a desired threshold value.

Some embodiments may first identify the most common subjects and then evaluate only those qualities that are related to those most common subjects. Other embodiments may consider qualities of any subject, regardless of whether that subject is one of the most common.

Embodiments of the present invention may accommodate any method desired by implementers of selecting such threshold values. An implementer might, for example, arbitrarily choose the ten most commonly identified subjects and the ten most commonly identified qualities because past experience has shown that higher thresholds tend to return too many less-desirable results and that lower thresholds do not return a sufficient number of useful results.

In step 225, the system extracts a set of objects from extrinsic sources. This step is similar to that of step 205, but this time searches for objects that are associated with a core subject or a core quality identified in step 220. There is no requirement that the system in step 225 consider exactly same set of sources than were considered in steep 205. In some embodiments, for example, the second extraction procedure of step 225 may consider a much broader set of sources that was considered in step 205, or may select a set of sources that are more closely related to the core subjects identified in step 220.

Some embodiments may limit extractions in step 205 to online sources that publish current news items and that post social-media postings, but then search larger, or more robust repositories, such as online encyclopedias or wilds.

In certain embodiments, objects extracted in step 225 may include facts, such as background information or external references. For example, if an impending opening Summer Olympics opening ceremony has been identified as a core subject, the system step 225 might extract other news items and social-media topics related to the ceremony, as well as Wikipedia articles that describe the history of the Olympics, past Summer Olympics ceremonies, and the most popular sports that will be featured in the following Olympic competitions.

In all cases, selection of the objects extracted in step 225 will be constrained by the contextual metrics of Table 1 and the confidence criteria of Table 2. In the currently running example, this would mean that the system in step 225 would select news items, topics, facts, and other objects that satisfied any of the criteria of Table 1, subject to the constraints of Table 2, and that were associated with either a core subject or that conformed to a core quality.

At the conclusion of step 225, the system will have retrieved a set of objects that satisfy the aforementioned contextual and confidence requirements and that are either associated with at least one of the core subjects identified in step 220 or that display a quality identified in step 220 as a core quality.

In step 230, the system sorts the objects extracted in step 225 into groups, where each group consists of objects associated with a particular core subject and with qualities associated with that particular core subject. In embodiments where an object may be associated with more than one core subject, that object may be comprised by more than one group.

In step 235, the system represents each of these groups as a Trie data structure, where each group's subject is represented by a root node of a corresponding Trie, each quality of a Trie's subject is represented by a node on the first level of the Trie, and each state of a quality at a particular time is represented by a descendant node of that quality's node. By ordering a quality node's descendant nodes chronologically along a nonbranching path to a leaf node, embodiments may represent a time-varying pattern of fluctuations in a characteristic of that quality as a path from the root node through the quality node and its descendant nodes to the leaf node.

Figure 3:
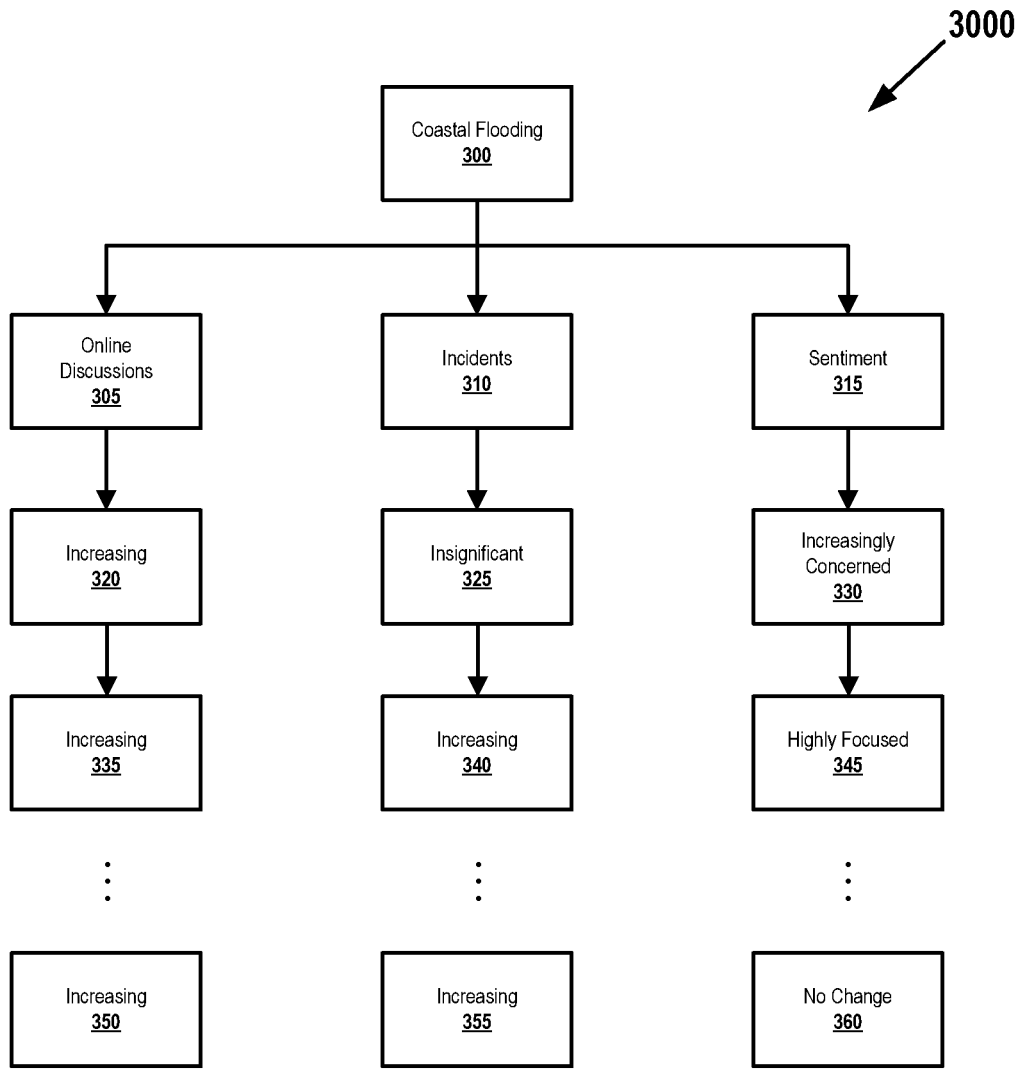
FIG. 3 illustrates an example of a Trie data stars re and describes how embodiments of the present invention may translate a set of online objects into such a Trie.

FIG. 3 illustrates an example of such a Trie data structure and describes how embodiments of the present invention may translate a set of extracted objects into such a Trie. As will be discussed in the description of FIG. 3, every root-to-leaf path through the Trie is capable of representing a pattern of states through which a quality of that Trie's subject passes through time.

In step 240, the system uses properties of Trie data structures to identify similarities between core subjects.

As mentioned above, and as is known in the art, a root-to-leaf path through a Trie may be represented as an ordered concatenation of key values associated with the nodes along that path. Embodiments of the present invention exploit this property of Trie structures to represent each root-to-leaf path as a character string. Because each such path represents a time-varying pattern of variations in a quality associated a Trie's subject, such a pattern can thus be represented as a string of characters.

Embodiments of the present invention deem two qualities to be similar when characteristics of the two qualities vary in similar ways over time. For example, if a first quality of a subject "virtual reality cameras" has increased monotonically for the last three days, and a second quality of a subject "wireless speakers" has increased monotonically for the last three days, the first quality might be deemed similar to the second quality.

If two strings are respectively derived from a pair of Trie root-to-leaf paths those two qualities may thus be deemed to be more similar if the two strings are more similar. It is thus possible to use known string-matching operations to identify similarity or to compare degrees of similarity between a pair of qualities. Embodiments use this property of the customized Trie structures described here in order to identify similar subjects.

For example, if the previously mentioned first quality and second quality are each associated with a 30-character root-to-leaf path, and if those two paths each contain a matching 25-character string, then an embodiment of the present invention may be able to quickly determine that the first quality is similar to the second quality.

Similarities between strings may be performed by any means known in the art, such as simple text-matching operations or more sophisticated analytics operations that infer meaning from identified strings. Such operations must comprise a means of determining relative similarity, such as by comparing a length of a first matching pattern found in a first pair of strings with a length of a second matching pattern n a second pair of strings. In such a case, a longer matching pattern or a greater number of matching characters may be deemed to indicate a greater degree of similarity. These methods may be used in conjunction with an arbitrarily chosen threshold value, such that a number of matching characters or a length of a matching patter that is greater than the threshold value indicates the existence of a similarity Embodiments of the present invention are flexible enough to accommodate any method of choosing a threshold value that may be known in the art, or that is desired by an implementer or other person with expert knowledge. In some cases, it is possible for an implementer to empirically refine a threshold by testing trial values until finding a value that produces a sufficient number of useful results without generating an excessive number of unusable results.

At the conclusion of step 240, the system will have used this method to identify pairs of matching qualities, where each quality is associated with a subject that is represented by the root node of the Trie associated with that quality.

Step 245 begins a two-step iterative procedure that comprises steps 245-250. In some embodiments, this iterative procedure continues indefinitely or until the system is manually paused or restarted. In some embodiments, the machine-learning function of step 250 may not be implemented. In such cases, the iterative procedure of steps 245-250 may be replaced by step 245.

In step 245, the system identifies "qualified pairs" of subjects that are deemed to be relevant to each other. Here, two relevant subjects are those that are associated with one or more pairs of similar qualities. As described above, two qualities are deemed to be similar when the character strings generated from the root-to-leaf Trie paths associated with the two qualities satisfy a threshold condition, such as a minimum length of matching substrings or character patterns respectively comprised by the two strings.

This is true regardless of whether the qualities themselves would normally be considered similar. Embodiments of the present invention find similarity between two subjects when a first quality associated with a first subject of the two varies over time in a way that is similar to a way in which a second quality associated with a second subject of the two varies over the same time span. This similarity exists regardless of whether the two qualities themselves are related in any other way.

At the conclusion of step 245, the system will have identified pairs of qualified subjects that, regardless of how similar those subjects may at first appear, may be deemed to be similar because they have elicited similar responses over time from online communities of interest.

In optional step 250, certain embodiments may use methods of machine learning or artificial intelligence to correlate the current results of step 245 with results of past iterations of step 245. In one example, the system might learn from past results that two subjects have repeatedly been found similar during prior performances of the procedure of FIG. 2. If the current iteration finds that strings associated with qualities of those two subjects are slightly too dissimilar to satisfy a threshold condition, the system might decide that the prior results justify identifying those two subjects as being similar despite a borderline result.

FIG. 3 illustrates an example of a Trie data structure 3000 and describes how embodiments of the present invention may translate a set of extracted objects into such a Trie. FIG. 3 comprises items 300-360 and 3000.

Trie 3000 represents a set of retrieved data objects associated with a subject represented by the Trie's root node 300 and further associated with a set of qualities that each describe a characteristic of that subject or of public interest in that subject.

In this example, root node 300 (at level 0) represents the subject "Coastal Flooding" and the next level contains three child nodes 305-315 (at level 1) of root node 300, each of which represents one quality of the subject "Coastal Flooding." Other Tries may identify different subjects and qualities, and may comprise a different number of child nodes in order to identify a different number of qualities.

Here, node 305 represents a first quality "Online Discussions" of the subject. Variations in this quality over time correspond to fluctuations over time in the number of objects that are associated with online discussions of coastal flooding.

Similarly, node 310 represents a second quality of the subject "incidents." Variations in this quality over time correspond to fluctuations over time in the number of events or occurrences that are associated with coastal flooding. This quality may be an important indicator of public interest in coastal flooding, since interest in flooding is more likely to increase during times when many instances of coastal flooding occur.

Node 315 represents a third quality of the subject "sentiment." Variations in this quality over time correspond to changes in the mood or sentiment of posted content related to coastal flooding. Social-media postings and news reports may, for example, initially be relatively unconcerned, then later become increasingly concerned, and finally trend toward being highly focused.

Each level of Trie 3000 below the level 1 child nodes 305-315 represents a state of a quality at a particular time. Each non-branching path from a level 1 child node 305-315 to a leaf node represents a chronologically ordered set of variations in the quality represented by that branch's node 305, 310, or 315.

For example, consider a case when 5,000 objects associated with a "coastal flooding" subject are retrieved from online sources. These objects are created during a period ranging from Sep. 1, 2017 through Sep. 9, 2017. Here, each node at a level of Trie 3000 below the level 1 "quality" nodes 305-315 characterizes a state of a corresponding quality on a particular date within that nine-day range.

For example, variations in the state of quality 305 "online discussions" during those 9 days might be represented by the branch running from root node 300 through leaf node 350, including intermediate nodes (not show for purposes of clarity) between nodes 335 and 350. Here, node 320 might represent a state of online discussions of coastal flooding on September 2, node 335 might represent a state of online discussions of coastal flooding on September 3, and leaf node 350 might represent a state of online discussions of coastal flooding on September 9.

If 100 of the 5,000 retrieved objects comprised postings related to online discussions of the topic on September 1, and 400 comprised similar postings on September 2, then the state of the "online discussions" topic on September 2, as shown in node 320, could be characterized as "increasing."

This would indicate that the number of postings to online discussions about coastal flooding had been increasing on September 2.

Similarly, if 500 postings to online discussions about coastal flooding were posted on September 3, then the next node 335 in the same branch would similarly characterize quality "online discussions" as "increasing." Finally, if online discussions about this topic are still increasing on September 9, leaf node 350 would also describe this quality as "increasing" on that date.

The path from nodes 320-350 identify a pattern of time-varying fluctuations in the quality represented by level 1 "child" node 305, where that quality is a quality of the subject represented by root node 300. The other two branches of Trie 3000 perform similar functions, If there are no incidents of coastal flooding on September 1, 1 incident on September 2, 6 incidents on September 3, 50 incidents on September 8, and 65 on September 9, then node 325 might identify a state of quality "incidents" on September 2 as being "insignificant," node 340 might identify the number of incidents on September 3 as "increasing," and node 355 might identify the number of incidents on September 9 as "increasing."

Similarly, the branch through nodes 330, 340, and 360 (including intermediate nodes between nodes 340 and 360, not show here for purposes of clarity), identify the states of quality "sentiment" on those same days. In this example, node 330 identifies that, on September 2, the sentiment of online social-media postings, opinion pieces, editorials, and news reports was becoming "increasingly concerned." On September 3, the general tone began to become "highly focused." During the period from September 8 through September 9, there was "no change" in the sentiment expressed by these online objects.

Figure 4:
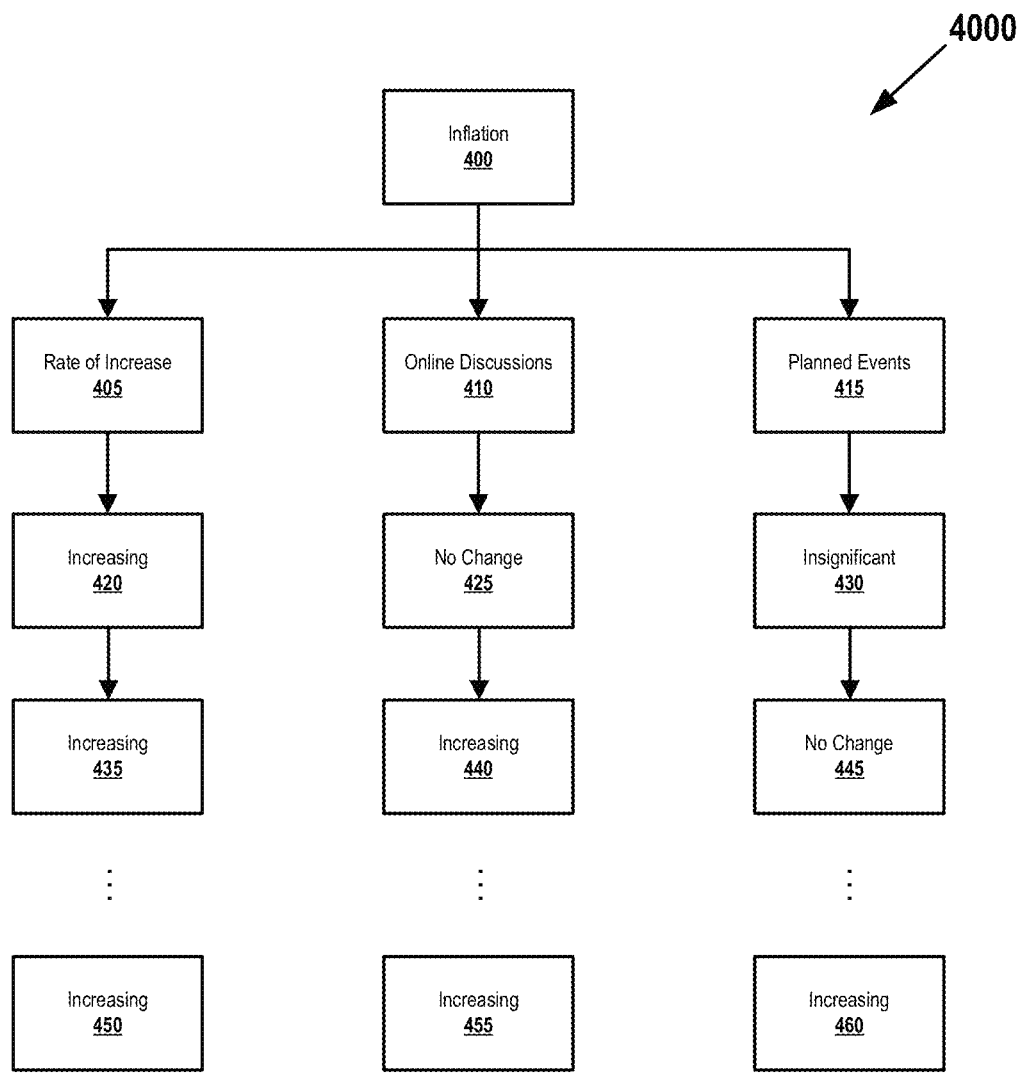
FIG. 4 illustrates a second example of a Trie data structure and describes how embodiments of the present invention may determine relative similarity of a subject and qualities represented by the Trie 3000 of FIG. 3.

FIG. 4 illustrates a second example of a Trie data structure 4000 and describes how embodiments of the present invention may determine relative similarity of a subject and qualities represented by Trie 4000 with a subject and qualities represented by Trie 3000 of FIG. 3. FIG. 4 comprises items 400-460 and 4000.

Trie 4000 is functionally similar to Trie 3000, but represents retrieved data objects associated with a different subject than the "inflation" topic represented by Trie 3000. Here Trie 4000's level-0 root node 400 is associated with the subject "inflation" and lower level nodes are associated with a set of qualities that each describe a characteristic of the subject "inflation."

In a manner analogous to that of the example of FIG. 3, root node 400 (at level 0) represents the subject "inflation" and the next level contains three child nodes 405-415 (at level 1) of root node 400 that each represent one quality of the subject "inflation."

Here, node 405 represents a first quality "Rate of Increase" of the subject. Variations in this quality over time correspond to fluctuations over time in the number of online objects (such as social-media postings, news items, or opinion pieces) that reference the topic "inflation." In FIG. 4, node 420 indicates that the number of such items was increasing on September 2, node 435 indicates that the number of such items was increasing on September 3, and node 450 indicates that the number of such items was increasing on September 9.

Similarly, node 410 represents a second quality of the subject "Online Discussions." Like the branch running from root node 300 through leaf node 350 in FIG. 3, the branch from node 425 through node 455, including intermediate nodes between node 440 and 455 not shown in the figure, represent day-by-day variations in the number of postings in online discussions that discuss inflation.

Nodes 425 and 440 of this branch respectively show that the number of postings did not change between September 1 and September 2, but increased on September 3. Node 455 indicates that the number of postings about this subject continued to increase during the period from September 8 through September 9.

Node 415 represents a third quality of the subject "planned events." Variations in this quality over time correspond to changes in the number of social-media postings, news reports, and other online objects posted in relation to with events, such as government announcements, budget approvals, or industry events, associated with the topic of inflation.

In this case, nodes 430 and 445 indicate that an insignificant number of such objects were posted on September 2 and September 3, Node 460 indicates that the number of such postings were, however, increasing on September 9.

Embodiments of the present invention may attempt to determine whether the subject "coastal flooding" is similar to the subject "inflation" by determining a degree of similarity between Trie 3000 and Trie 4000, which respectively represent all retrieved objects related to one of these two subjects.

Such embodiments may use any means known in the art to identify such similarities, including a variety of statistical methods. Known properties of Trie data structures, however, allow some embodiments to perform this operation with great efficiency by using known properties of Trie data structures and simple text pattern-matching operations.

Unlike conventional binary trees, Trie data structures store only a short index in each node. By omitting the full data identified by each node, Tries are relatively compact, allowing metadata about data identified by each node to be represented and manipulated with great efficiency.

Embodiments of the present invention elaborate on this known property by storing only a small text string in each node below the "quality" level-1 child nodes that identifies a state of a property. Any alphanumeric string (or other numeric or non-numeric identifier desired by an implementer) may be chosen, but in the examples of FIGS. 3 and 4, the strings shown below in Table 3 are chosen for pedagogical purposes:

TABLE 3

| String | . . . Represents Value |
|---|---|
| CF | Coastal Flooding |
| If | Inflation |
| OD | Online Discussions |
| Ic | Incidents |
| Se | Sentiment |
| RI | Rate of Increase |
| PE | Planned Events |
| In | Increasing |
| De | Decreasing |
| Is | Insignificant |
| IC | Increasingly Concerned |
| IA | Highly Focused |
| NC | No Change |

Node 400, for instance, in this example would be represented by string "Ifs" node 410 by string "OD," and node 460 by string "In." In other examples and embodiments, a different set of strings may be used to represent different types of nodes, but in all cases, an implementer is free to select any desired string to represent a node that represents a specific type of content.

If each node is represented by a string in this manner, each root-to-leaf branch may be represented as an ordered concatenation of the strings represented by each node of the branch. A pattern of changes in a quality of a subject may thus be represented as a concatenated string of a branch that represents such a pattern.

In the Examples of FIGS. 3 and 4, therefore, the root-to-leaf branches may be represented by the concatenated strings. In this example, for purposes of simplicity, we do not consider the nodes omitted from FIGS. 3 and 4 for clarity, such as the nodes lying along the subpath between nodes 335 and 350, or along the subpath between nodes 440 and 455.

TABLE 4

| String | . . . Represents Branch |
|---|---|
| CF-OD-In-In- . . . -In | 300-305-320-335- . . . -350 |
| CF-Ic-Is-In-In- . . . -In | 300-310-325-340- . . . -355 |
| CF-Se-In-IC-IA- . . . -NA | 300-315-330-345- . . . -360 |
| If-RI-In-In- . . . -In | 400-405-420-435- . . . -450 |
| If-OD-NC-In- . . . -In | 400-410-425-440- . . . -455 |
| If-PE-Is-NC- . . . -In | 400-415-430-445- . . . -460 |

Here, it can be seen that two branches represent identical patterns in a quality. The branch comprising nodes 300, 305, 320, 335, and 350, representing the Online Discussions quality of subject Coastal Flooding, and the branch comprising nodes 400, 405, 420, 435, and 450, representing the Rate of Increase quality of subject Inflation, both comprise a pattern that may be represented as "In-In-In . . . In." Ignoring the omitted nodes, these two branches thus comprise a matching patterns of length 4 (that is, they contain identical sequences of four node identifiers). No other concatenated strings comprise a matching substring of equal or greater length.

Embodiments of the present invention are flexible enough to accommodate any arbitrary threshold by which similarity may be determined. A more stringent threshold will result in identifying a smaller number of similar subjects that have a higher degree of similarity, and a lower threshold produces a greater number of results that may not be as similar. Implementers are free to select any s threshold that satisfies a goal or intent of a particular embodiment.

For example, if two Tries are deemed to be similar if they comprise branches that may be represented by at least two pairs of matching substrings of length 5 or greater, then Trie 3000 and Trie 4000 would be deemed to be dissimilar.

However, if two Tries are deemed to be similar if they comprise branches that may be represented by a single pair of matching substrings of length 4 or greater, then Trie 3000 and Trie 4000 would be deemed to be similar and the subjects "coastal flooding" and "inflation" would be returned to a calling application, and would be identified to that application as being similar.

In some embodiments, the system may return results to a calling application that identify both a quality and a subject. In the current example, such an embodiment would identify that a number of online discussions of the subject "coastal flooding" is similar to a rate of increase of interest in the subject "inflation." Such a counterintuitive and nonobvious similarity could then be used by a decision-support application, an artificially intelligent conversational user interface program, or similar software module, to generate output that would not otherwise be possible without an identification of the similarity.

What is claimed is:

1. An input-selection system of a decision-support application comprising a processor, a memory coupled to the processor, and a computer-readable hardware storage device coupled to the processor, the storage device containing program code configured to be run by the processor via the memory to implement a method for using Trie structures to identify similarities among topical subjects, the method comprising:
   receiving, from a decision-support application, a set of contextual constraints, a set of confidence factors, and a request for an identification of two subjects of interest that satisfy the set of contextual constraints and that meet a similarity criterion,
      where a first subject of the two subjects is associated with a first subset of a set of time-varying qualities,
      where a second subject of the two subjects is associated with a second subset of the set of time-varying qualities,
      where the similarity criterion deems the two subjects to be similar if, during a period of time specified by the similarity criterion, a first pattern of variations of the first subset is similar to a second pattern of variations of the second subset, and
      where the similarity criterion comprises a similarity threshold capable of allowing the input-selection system to determine whether two patterns of variations are similar;
   extracting from a first set of online sources a set of objects that each satisfy at least one constraint of the set of contextual constraints,
      where a first object of the set of objects is associated with a corresponding subject and with a first quality of public interest in the corresponding subject;
   selecting a core set of subjects and a core set of qualities,
      where the core set of subjects comprises subjects that are each associated with a number of objects of the set of objects that exceeds a core-subject threshold value, and
      where the core set of qualities comprises qualities that are each associated with a number of objects of the set of objects that exceeds a core-quality threshold value;
   retrieving from a second set of online sources a quantity of objects that each satisfy at least one constraint of the set of contextual constraints and that are each associated with a subject of the core set of subjects or with a quality of the core set of qualities;
   representing the quantity of objects as a set of Trie data structures,
      where each Trie of the set of Trie data structures represents objects associated with one core subject of the core set of subjects and further represents a pattern of variations over time in one or more qualities of the core set of qualities, and
      where each of the one or more qualities is a quality of public interest in the one core subject;
   determining, as a function of the similarity criterion, a pair of similar Tries of the set of Trie data structures;
   identifying the two subjects as being a pair of core subjects that are respectively represented by the pair of similar Tries; and
   returning to the decision-support application the two identified subjects.

2. The input-selection system of claim 1, where determining that a first Trie of the set of Trie data structures is similar to a second Trie of the set of Trie data structures comprises:
   generating a first set of character strings that each represent a root-to-leaf path of the first Trie and a second set of character strings that each represent a root-to-leaf path of the second Trie; and
   identifying one or more strings of the first set of character strings that are similar to one or more strings of the second set of character strings,
      where a pair of strings are deemed to be similar if a length of a substring common to both of the pair of strings exceeds a threshold value specified by the similarity criterion.

3. The input-selection system of claim 1,
   where a root node of a first Trie of the set of Trie data structures represents a first Trie subject of the core set of subjects,
   where a child node of the root node represents a first Trie quality, comprised by the core set of qualities, that is associated with the first Trie subject,
   where descendant nodes of the child node form a non-branching path to a leaf node of the first Trie,
   where each node of the descendant nodes identifies a state of the first Trie quality at a particular time,
   where the descendant nodes are ordered along the non-branching path in chronological order, and
   where a path through the first Trie from the root node through the leaf node represents a pattern of fluctuations in the first Trie quality throughout the period of time specified by the similarity criterion.

4. The input-selection system of claim 1, where the extracting further comprises:
   retrieving a collection of objects from the first set of online sources,
      where the collection of objects consists of groups of objects,
      where each object in a first group of the groups of objects satisfies the first constraint;
   filtering the first group by determining whether each object in the first group satisfies a second constraint of the set of contextual constraints, within a margin of error defined by the set of confidence factors;
   discarding any object in the first group that does not satisfy the second constraint within the margin of error; and
   merging the groups into the set of objects.

5. The input-selection system of claim 4, where a first confidence factor of the set of confidence factors modifies the second constraint in a manner selected from the group consisting of:
   deeming that all objects of the first group satisfy the second constraint so long as a subset of all objects of the first group satisfy the second constraint during a specified portion of the period of time;
   deeming that all objects of the first group satisfy the second constraint only if objects of the first group spawn other objects that satisfy the second constraint at a rate defined by a specified propagation rate; and
   deeming that a particular object of the first group satisfies the second constraint if the particular object satisfies the second constraint within a specified tolerance range.

6. The input-selection system of claim 1, where the set of contextual constraints constrains the set of objects to one or more constraints selected from the group consisting of:

objects created at a particular geographic location,
objects that comprise content associated with a particular geographic location,
objects created by members of a particular demographic population,
objects that comprise content associated with a particular demographic population, and
objects associated with a subject that has been trending during a particular time period.

7. The input-selection system of claim 1, where the set of objects comprises:
news-event content of online news sources, where each object of the news-event content is associated with one or more news events, and
social-media content posted to social-media services, where each posting of the social-media content is associated with a particular subject.

8. The input-selection system of claim 1, where the quantity of objects comprises:
news-event content of online news sources, where each object of the news-event content is associated with one or more news events,
social-media content posted to social-media services, where each posting of the social-media content is associated with a particular subject, and
factual content retrieved from online information repositories, where each object of the factual content identifies factual information.

9. A method for using Trie structures to identify similarities among topical subjects, the method comprising:
an input selection system of a decision-support application receiving, from a decision-support application, a set of contextual constraints, a set of confidence factors, and a request for an identification of two subjects of interest that satisfy the set of contextual constraints and that meet a similarity criterion,
where a first subject of the two subjects is associated with a first subset of a set of time-varying qualities,
where a second subject of the two subjects is associated with a second subset of the set of time-varying qualities,
where the similarity criterion deems the two subjects to be similar if, during a period of time specified by the similarity criterion, a first pattern of variations of the first subset is similar to a second pattern of variations of the second subset, and
where the similarity criterion comprises a similarity threshold capable of allowing the input-selection system to determine whether two patterns of variations are similar;
extracting from a first set of online sources a set of objects that each satisfy at least one constraint of the set of contextual constraints,
where a first object of the set of objects is associated with a corresponding subject and with a first quality of public interest in the corresponding subject;
selecting a core set of subjects and a core set of qualities,
where the core set of subjects comprises subjects that are each associated with a number of objects of the set of objects that exceeds a core-subject threshold value, and
where the core set of qualities comprises qualities that are each associated with a number of objects of the set of objects that exceeds a core-quality threshold value;
retrieving from a second set of online sources a quantity of objects that each satisfy at least one constraint of the set of contextual constraints and that are each associated with a subject of the core set of subjects or with a quality of the core set of qualities;
representing the quantity of objects as a set of Trie data structures,
where each Trie of the set of Trie data structures represents objects associated with one core subject of the core set of subjects and further represents a pattern of variations over time in one or more qualities of the core set of qualities, and
where each of the one or more qualities is a quality of public interest in the one core subject;
determining, as a function of the similarity criterion, a pair of similar Tries of the set of Trie data structures;
identifying the two subjects as being a pair of core subjects that are respectively represented by the pair of similar Tries; and
returning to the decision-support application the two identified subjects.

10. The method of claim 9, where determining that a first Trie of the set of Trie data structures is similar to a second Trie of the set of Trie data structures comprises:
generating a first set of character strings that each represent a root-to-leaf path of the first Trie and a second set of character strings that each represent a root-to-leaf path of the second Trie; and
identifying one or more strings of the first set of character strings that are similar to one or more strings of the second set of character strings,
where a pair of strings are deemed to be similar if a length of a substring common to both of the pair of strings exceeds a threshold value specified by the similarity criterion.

11. The method of claim 9,
where a root node of a first Trie of the set of Trie data structures represents a first Trie subject of the core set of subjects,
where a child node of the root node represents a first Trie quality, comprised by the core set of qualities, that is associated with the first Trie subject,
where descendant nodes of the child node form a non-branching path to a leaf node of the first Trie,
where each node of the descendant nodes identifies a state of the first Trie quality at a particular time,
where the descendant nodes are ordered along the non-branching path in chronological order, and
where a path through the first Trie from the root node through the leaf node represents a pattern of fluctuations in the first Trie quality throughout the period of time specified by the similarity criterion.

12. The method of claim 9, where the extracting further comprises:
retrieving a collection of objects from the first set of online sources,
where the collection of objects consists of groups of objects,
where each object in a first group of the groups of objects satisfies the first constraint;
filtering the first group by determining whether each object in the first group satisfies a second constraint of the set of contextual constraints, within a margin of error defined by the set of confidence factors;
discarding any object in the first group that does not satisfy the second constraint within the margin of error; and
merging the groups into the set of objects.

13. The method of claim 12, where a first confidence factor of the set of confidence factors modifies the second constraint in a manner selected from the group consisting of:
- deeming that all objects of the first group satisfy the second constraint so long as a subset of all objects of the first group satisfy the second constraint during a specified portion of the period of time;
- deeming that all objects of the first group satisfy the second constraint only if objects of the first group spawn other objects that satisfy the second constraint at a rate defined by a specified propagation rate; and
- deeming that a particular object of the first group satisfies the second constraint if the particular object satisfies the second constraint within a specified tolerance range.

14. The method of claim 9, where the set of contextual constraints constrains the set of objects to one or more constraints selected from the group consisting of:
- objects created at a particular geographic location,
- objects that comprise content associated with a particular geographic location,
- objects created by members of a particular demographic population,
- objects that comprise content associated with a particular demographic population, and
- objects associated with a subject that has been trending during a particular time period.

15. The method of claim 9, further comprising providing at least one support service for at least one of creating, integrating, hosting, maintaining, and deploying computer-readable program code in the computer system, wherein the computer-readable program code in combination with the computer system is configured to implement the receiving, the extracting, the selecting, the retrieving, the representing, the determining, the identifying, and the returning.

16. A computer program product, comprising a computer-readable hardware storage device having a computer-readable program code stored therein, the program code configured to be executed by computer system comprising a processor, a memory coupled to the processor, and a computer-readable hardware storage device coupled to the processor, the storage device containing program code configured to be run by the processor via the memory to implement a method for using Trie structures to identify similarities among topical subjects, the method comprising:
- an input selection system of a decision-support application receiving, from a decision-support application, a set of contextual constraints, a set of confidence factors, and a request for an identification of two subjects of interest that satisfy the set of contextual constraints and that meet a similarity criterion,
  - where a first subject of the two subjects is associated with a first subset of a set of time-varying qualities,
  - where a second subject of the two subjects is associated with a second subset of the set of time-varying qualities,
  - where the similarity criterion deems the two subjects to be similar if, during a period of time specified by the similarity criterion, a first pattern of variations of the first subset is similar to a second pattern of variations of the second subset, and
  - where the similarity criterion comprises a similarity threshold capable of allowing the input-selection system to determine whether two patterns of variations are similar;
- extracting from a first set of online sources a set of objects that each satisfy at least one constraint of the set of contextual constraints,
  - where a first object of the set of objects is associated with a corresponding subject and with a first quality of public interest in the corresponding subject;
- selecting a core set of subjects and a core set of qualities,
  - where the core set of subjects comprises subjects that are each associated with a number of objects of the set of objects that exceeds a core-subject threshold value, and
  - where the core set of qualities comprises qualities that are each associated with a number of objects of the set of objects that exceeds a core-quality threshold value;
- retrieving from a second set of online sources a quantity of objects that each satisfy at least one constraint of the set of contextual constraints and that are each associated with a subject of the core set of subjects or with a quality of the core set of qualities;
- representing the quantity of objects as a set of Trie data structures,
  - where each Trie of the set of Trie data structures represents objects associated with one core subject of the core set of subjects and further represents a pattern of variations over time in one or more qualities of the core set of qualities, and
  - where each of the one or more qualities is a quality of public interest in the one core subject;
- determining, as a function of the similarity criterion, a pair of similar Tries of the set of Trie data structures;
- identifying the two subjects as being a pair of core subjects that are respectively represented by the pair of similar Tries; and
- returning to the decision-support application the two identified subjects.

17. The computer program product of claim 16, where determining that a first Trie of the set of Trie data structures is similar to a second Trie of the set of Trie data structures comprises:
- generating a first set of character strings that each represent a root-to-leaf path of the first Trie and a second set of character strings that each represent a root-to-leaf path of the second Trie; and
- identifying one or more strings of the first set of character strings that are similar to one or more strings of the second set of character strings,
  - where a pair of strings are deemed to be similar if a length of a substring common to both of the pair of strings exceeds a threshold value specified by the similarity criterion.

18. The computer program product of claim 17,
- where a root node of a first Trie of the set of Trie data structures represents a first Trie subject of the core set of subjects,
- where a child node of the root node represents a first Trie quality, comprised by the core set of qualities, that is associated with the first Trie subject,
- where descendant nodes of the child node form a non-branching path to a leaf node of the first Trie,
- where each node of the descendant nodes identifies a state of the first Trie quality at a particular time,
- where the descendant nodes are ordered along the non-branching path in chronological order, and
- where a path through the first Trie from the root node through the leaf node represents a pattern of fluctuations in the first Trie quality throughout the period of time specified by the similarity criterion.

19. The computer program product of claim 16, where the extracting further comprises:
retrieving a collection of objects from the first set of online sources,
  where the collection of objects consists of groups of objects,
  where each object in a first group of the groups of objects satisfies the first constraint;
filtering the first group by determining whether each object in the first group satisfies a second constraint of the set of contextual constraints, within a margin of error defined by the set of confidence factors;
discarding any object in the first group that does not satisfy the second constraint within the margin of error; and
merging the groups into the set of objects.

20. The computer program product of claim 19, where a first confidence factor of the set of confidence factors modifies the second constraint in a manner selected from the group consisting of:
deeming that all objects of the first group satisfy the second constraint so long as a subset of all objects of the first group satisfy the second constraint during a specified portion of the period of time;
deeming that all objects of the first group satisfy the second constraint only if objects of the first group spawn other objects that satisfy the second constraint at a rate defined by a specified propagation rate; and
deeming that a particular object of the first group satisfies the second constraint if the particular object satisfies the second constraint within a specified tolerance range.

* * * * *